United States Patent [19]

Aizawa

[11] Patent Number: 5,050,022
[45] Date of Patent: Sep. 17, 1991

[54] CASSETTE LOADING APPARATUS HAVING DRIVING GEARS

[75] Inventor: Hidekuni Aizawa, Kanagawa, Japan

[73] Assignee: Sony Corporation, Tokyo, Japan

[21] Appl. No.: 519,433

[22] Filed: May 4, 1990

[30] Foreign Application Priority Data

May 31, 1989 [JP] Japan .................................. 1-137683

[51] Int. Cl.$^5$ .......................... G03B 1/04; G11B 5/008
[52] U.S. Cl. ..................................... 360/96.5; 242/198
[58] Field of Search ....................... 360/96.5, 96.6, 93; 242/198

[56] References Cited

U.S. PATENT DOCUMENTS

| | | | |
|---|---|---|---|
| 4,628,382 | 12/1986 | Okumura | 360/96.5 |
| 4,661,867 | 4/1987 | Tsubota | 360/96.5 |
| 4,930,720 | 6/1990 | Hwang | 360/96.5 |

*Primary Examiner*—A. J. Heinz
*Assistant Examiner*—Jefferson Evans
*Attorney, Agent, or Firm*—Lewis H. Eslinger; Jay H. Maioli

[57] ABSTRACT

A cassette loading apparatus having a cassette holder for holding a tape cassette and driven by a gear train to move the tape cassette to a predetermined loading position includes a pair of gears in engagement with each other in the gear train, at least one of the pair of gears being formed as a geneva stop gear, a locking member provided on one of the pair of gears, and a cam formed on the other gear being in engagement with the locking member. The cam has an increased length, so that when the pair of gears are in engagement the locking member is restricted by the cam and when the pair of gears are disengaged from each other by the geneva stop gear, a rotational ratio substantially equal to a gear ratio of the pair of gears is applied to the pair of gears by the cam and the locking member. In this way when the cassette holder is moved to the loading position the locking member comes in contact with the cam, thereby locking the cassette holder.

7 Claims, 8 Drawing Sheets

CASSETTE LOADING APPARATUS HAVING DRIVING GEARS

BACKGROUND OF THE DISCLOSURE

1. Field of the Invention

The present invention relates generally to a cassette loading apparatus and, more particularly, to a cassette loading apparatus having a driving gear for use with a front-loading type video tape recorder.

2. Description of the Background

Japanese Patent Application No. 62-78746 having the same assignee as the instant application describes a cassette holder locking mechanism for locking a cassette holder when it is moved to the loading position in a front-loading type video tape recorder. FIG. 1 is a pictorial representation of such a locking mechanism for a cassette holder that has been previously proposed.

As shown in FIG. 1, this cassette holder locking mechanism is comprised of a drive gear 1 and a follower gear 2, each of drive gear 1 and follower gear 2 being only so-called segment gears. Drive gear 1 is provided at an outer peripheral portion thereof with a worm gear 3 that is driven by a motor 8, whereas follower gear 2 is provided with a drive arm 4 that moves a pin arranged at the side walls of a cassette holder (not shown). When drive gear 1 is driven by motor 8 through worm gear 3, follower gear 2 is driven by drive gear segment 1, so that drive arm 4 pushes the pin of the cassette holder, whereby the cassette holder is moved to a predetermined loading position.

In the arrangement of the elements shown in FIG. 1, the cassette holder is also locked by the above-described drive mechanism by using a protrusion 6 provided on follower gear 2 that is received by a guide rib 7 provided on drive gear 1. More specifically, the cassette holder is held by this locking mechanism when follower gear 2 produces a rotational force in the direction shown by arrow 5 and this rotational force is received by guide rib 7 of drive gear 1 through protrusion 6. Then, the rotational force of follower gear 2 is received by drive gear 1 via protrusion 6 and guide rib 7, whereby follower gear 2 is prevented from being rotated.

It is to be noted that the locking mechanism of this previously proposed cassette loading apparatus has the following problems associated with it. In the initial stage where the tape cassette is moved to the loading position when the tape cassette is loaded on the cassette holder, drive gear 1 and follower gear 2 are driven while being meshed with each other, however, if drive gear 1 and follower gear 2 are disengaged from each other and can not be meshed with each other, then protrusion 6 is pushed by guide rib 7 of drive gear 1, thereby effecting the locked state shown in FIG. 1. When the gear pair formed of drive gear 1 and follower gear 2 are not meshed with each other, the two gears are free to have independent, random rotation, so that when the gears become meshed again they will be at positions other than the correct position.

Further, if the tape cassette has been loaded in the cassette compartment and the power switch is turned OFF, then it is frequently the case that the tape cassette is ejected because the locked condition is not yet effected. Furthermore, the locked condition depends on the design or accuracy of cams in the locking portion so that satisfactory efficiency of the locking mechanism can not be maintained without difficulty.

OBJECTS AND SUMMARY OF THE INVENTION

Therefore, it is an object of the present invention to provide an improved cassette loading apparatus having driving gears in which the above-described defects encountered with previously proposed mechanisms can be eliminated.

More specifically, it is an object of the present invention to provide a cassette loading apparatus having driving gears in which random, independent displacement of the gears in a gear train due to load fluctuations during operation can be avoided.

It is another object of the present invention to provide a cassette loading apparatus having driving gears in which problems such as misloading of the tape cassette due to vibrations or the like after the tape cassette has been loaded are positively avoided.

It is still another object of the present invention to provide a cassette loading apparatus having driving gears in which a control operation and the overall design can be simplified and in which the accuracy required during assembly of the parts can be reduced.

In accordance with a first aspect of the present invention, a cassette loading apparatus, which has a cassette holder for loading thereon a tape cassette that is moved by a drive source through a gear train to thereby move the tape cassette to a predetermined loading position, is comprised of a pair of gears being in engagement with each other in the gear train, at least one of the pair of gears being formed as a geneva stop gear, a locking member being provided on one of the pair of gears, and a cam formed on the other gear. The cam is in engagement with the locking member and has an increased length, so that when the pair of gears are in engagement with each other, the locking member is restricted by the cam. Furthermore, when the pair of gears are disengaged from each other by the geneva stop gear, a rotational ratio substantially equal to a gear ratio of the pair of gears is applied to the pair of gears by the cam and the locking member, wherein when the cassette holder is moved to a loading position, the locking member comes in contact with the cam, thereby locking the cassette holder.

The above and other objects, features, and advantages of the present invention will be apparent from the following detailed description of a preferred embodiment of the invention with reference to the accompanying drawings, in which like reference numerals represent the same or similar elements in the several views.

DETAILED DESCRIPTION OF PREFERRED EMBODIMENT

Figure 1:
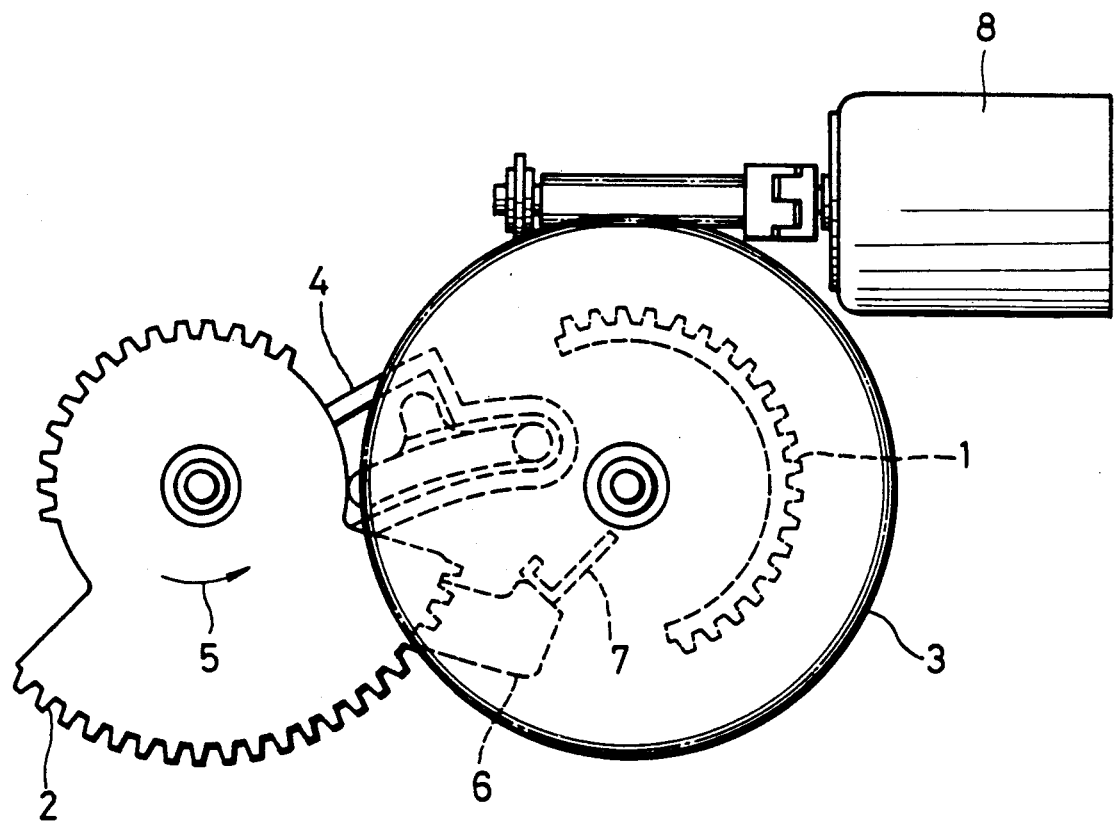
FIG. 1 is an elevational view of a main portion of a previously proposed cassette holder locking mechanism.
Figure 2:
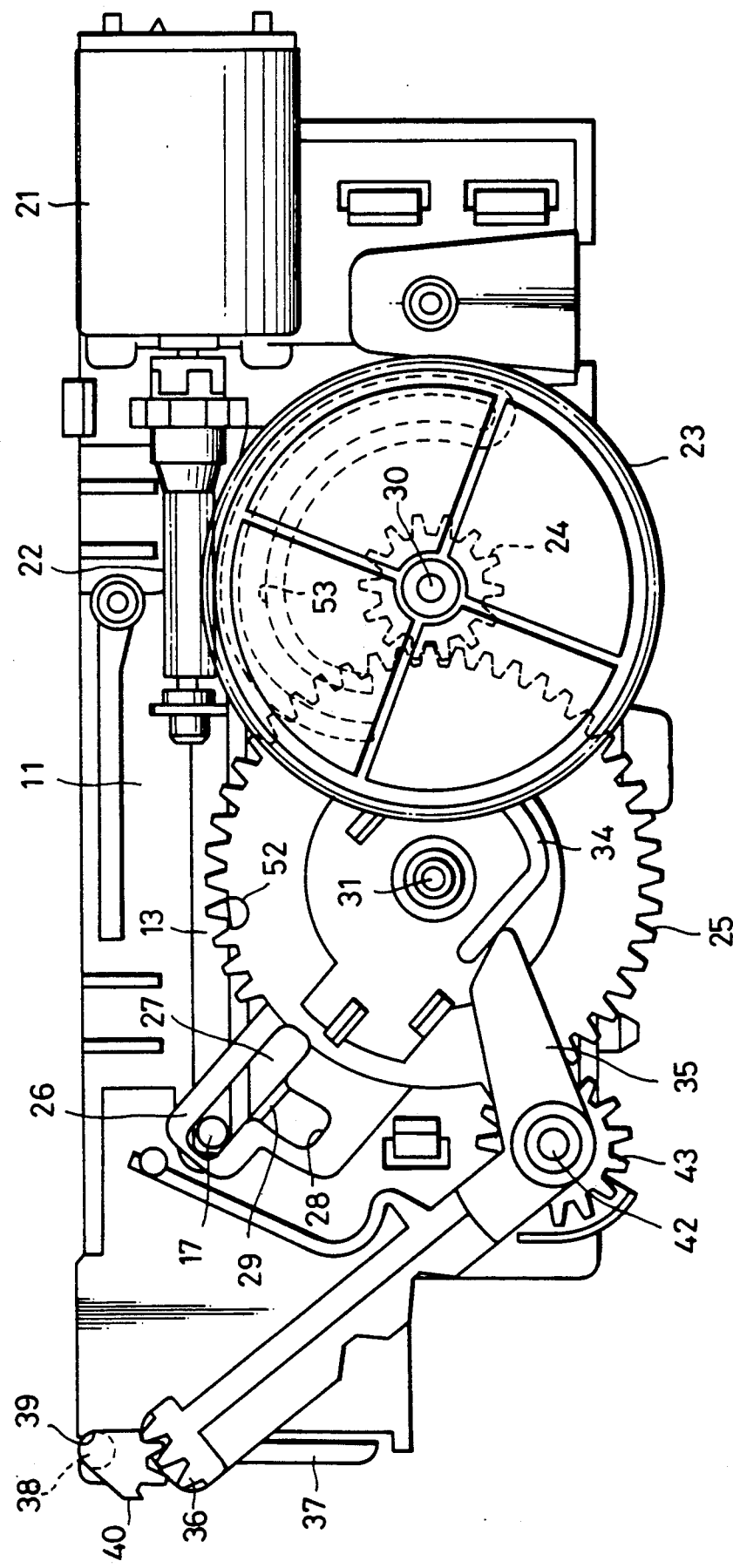
FIG. 2 is an elevational view of a drive portion of a cassette loading apparatus according to an embodiment of the present invention.
Figure 3:
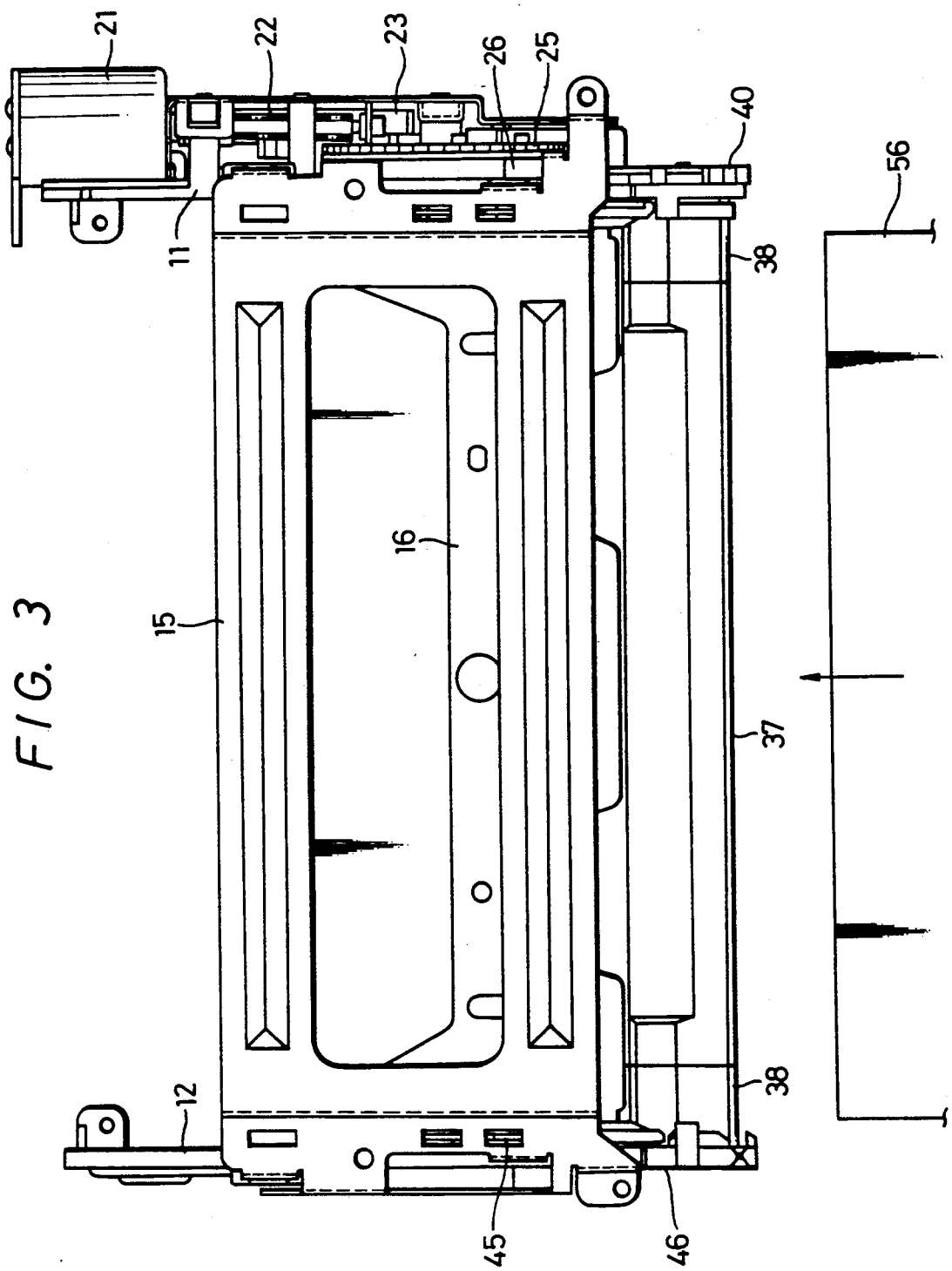
FIG. 3 is a plan view of an overall arrangement of a cassette holder according to an embodiment of the present invention.
Figure 4:
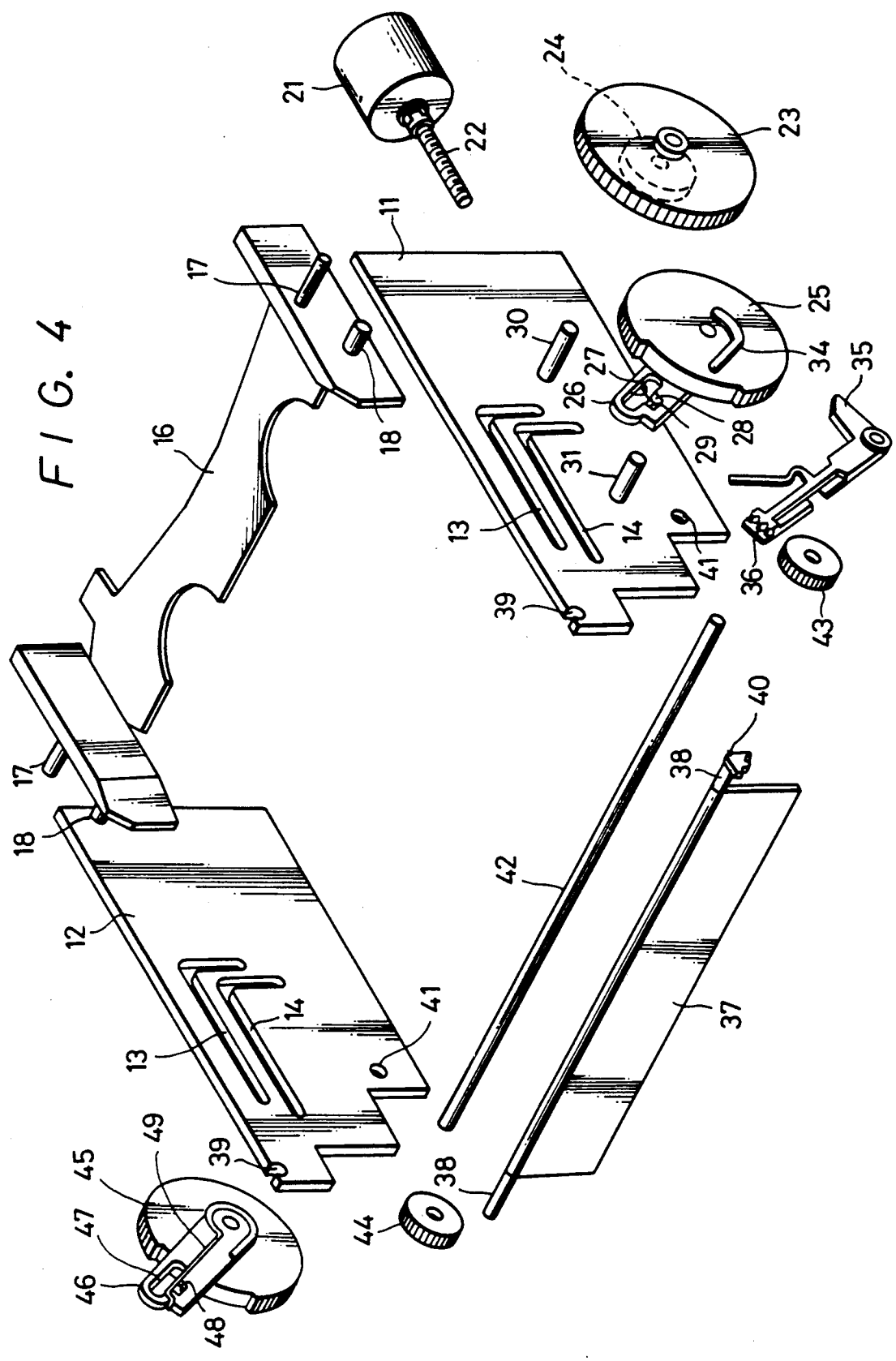
FIG. 4 is an exploded perspective view of the apparatus of FIG. 3.

FIGS. 2 to 4 show a cassette loading apparatus for use with a front-loading video tape recorder according to an embodiment of the present invention, and referring initially to FIG. 4 this cassette loading apparatus is provided with right and left frames 11 and 12, respectively. Each of frames 11 and 12 has formed therethrough L-shaped slots 13 and 14, and frames 11 and 12 are coupled to each other at the upper portions thereof by means of a coupling plate, shown at 15 in FIG. 3. A cassette holder 16 is movably mounted between frames 11 and 12 such that it can be freely shifted between positions. More specifically, two pins 17 and 18 are provided on each side plate of cassette holder 16 and are slidably movable within L-shaped grooves 13 and 14 formed in frames 11 and 12.

As shown in FIGS. 2 to 4, a motor 21 is arranged outside of side plate 11, and a worm 22 is formed on the output shaft of motor 21. Worm 22 is meshed with a worm gear 23, as shown in FIG. 2. Worm gear 23 is provided at its center with a pinion 24 that is meshed with a geneva stop gear 25 whose gear teeth are absent over a segment thereof. Gear 25 is attached to a drive lever 26 that has a rectangular aperture 27 formed therein into which a pin 17 of cassette holder 16 is inserted. Rectangular aperture 27 communicates with a further recess 28 also formed in drive lever 26, and a spring 29 is attached to the inside of drive lever 26 so as to normally keep pin 17 within rectangular aperture 27. Worm gear 23 and gear 25 are rotatably supported by support shafts 30 and 31, respectively, provided on frame 11.

A cam 34 is formed on the outside of gear 25 relative to drive lever 26, and cam 34 is used to operate an open and close lever 35, which has a toothed portion 36 at one end. A shutter plate 37 is opened and closed by toothed portion 36. More specifically, as shown in FIG. 4, shutter plate 37 is carried by a support shaft 38, whose ends are supported by cutouts 39 in frames 11 and 12, so that support shaft 38 can be freely rotated. In addition, as shown in FIG. 2, a gear segment 40 is secured to one end of support shaft 38 and arranged to mesh with toothed portion 36 on lever 35.

Through-holes 41 are respectively formed through the frames 11 and 12, and a shaft 42 is inserted at both ends into respective through-holes 41. As shown in FIGS. 2 and 4, a gear 43 is secured to one end of shaft 42 outside of frame 11 and another gear 44 is attached to the other end of shaft 42 outside of frame 12. Gear 44 is intended to mesh with gear 45, which has no gear teeth over a circumferential segment and is arranged outside of frame 12. Rotation of gear 25 is transmitted to gear 45 through gear 43, shaft 42, and gear 44 in an opposing direction to that of gear 25. Gear 45 is also provided with a drive lever 46 that has a rectangular aperture 47 formed therethrough. A recess 48 communicates with rectangular aperture 47, and a spring 49 is attached to the inside of drive lever 49 facing frame 12, as shown in FIG. 4 to keep pin normally in aperture 47.

Referring to FIG. 2, a pin 52 is implanted on the outside flat surface of gear 25, which also has drive lever 26 arranged on the inside flat surface thereof. A long cam groove 53 is formed on the inside flat surface of worm gear 23 such that it extends in a circumferential fashion relative to worm gear 23. Pin 52 is received by cam groove 53 and due to the mutual action of pin 52 and cam groove 53, the cassette holder 16 can be locked when it is moved to the loading position. This locking action will be explained hereinafter.

In the above-described arrangement shown in FIG. 2, when motor 21 drives worm 22 a rotational force is transmitted to worm gear 23, pinion 24, gear 25, and drive lever 26 in that order. Accordingly, drive lever 26 is rotated around support shaft 31 affixed to frame 11 in the clockwise direction, as shown in FIGS. 5 to 8. In accordance with such clockwise rotation of drive lever 26, pin 17 on the side wall of cassette holder 16 extends through slot 13 in frame 11 and is inserted into rectangular aperture 27 of drive lever 26, so that the pins 17 of the cassette holder 16 are moved along the L-shaped slots 13 in side plates 11 and 12 by drive lever 26. In other words, pins 17 are moved in a horizontal direction in the initial stage of operation, and when pins 17 reach a predetermined position, they are moved downwardly in the vertical direction, whereby a tape cassette, shown generally at 56 in FIG. 3, that has been inserted into cassette holder 16 is loaded at a predetermined loading position.

Figure 8:
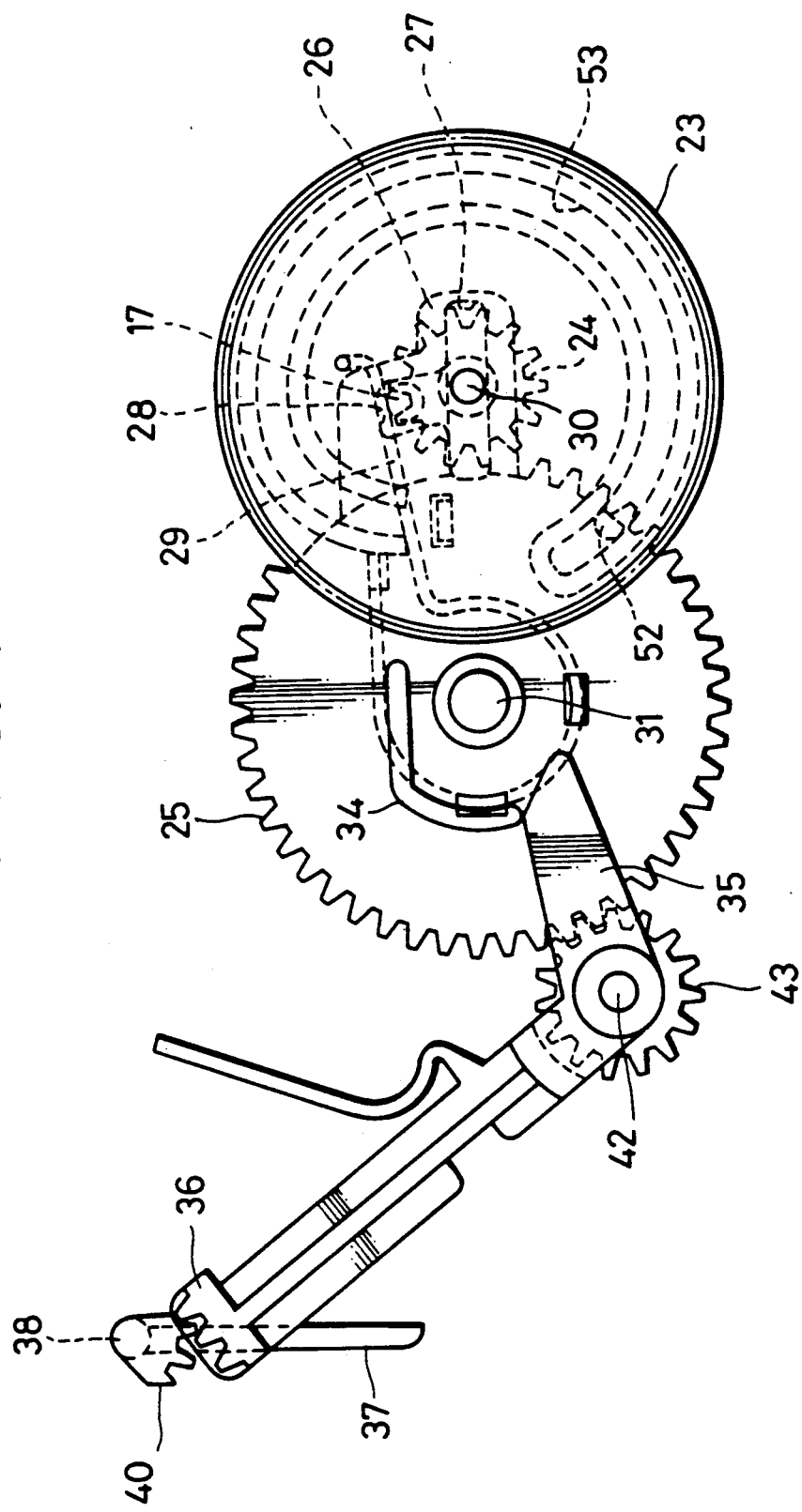

Cassette holder 16 upon being moved to the predetermined loading position is locked by means of the cooperation between pin 52, gear 25, and cam groove 53 on worm gear 23, as shown in FIG. 8.

Figure 5:
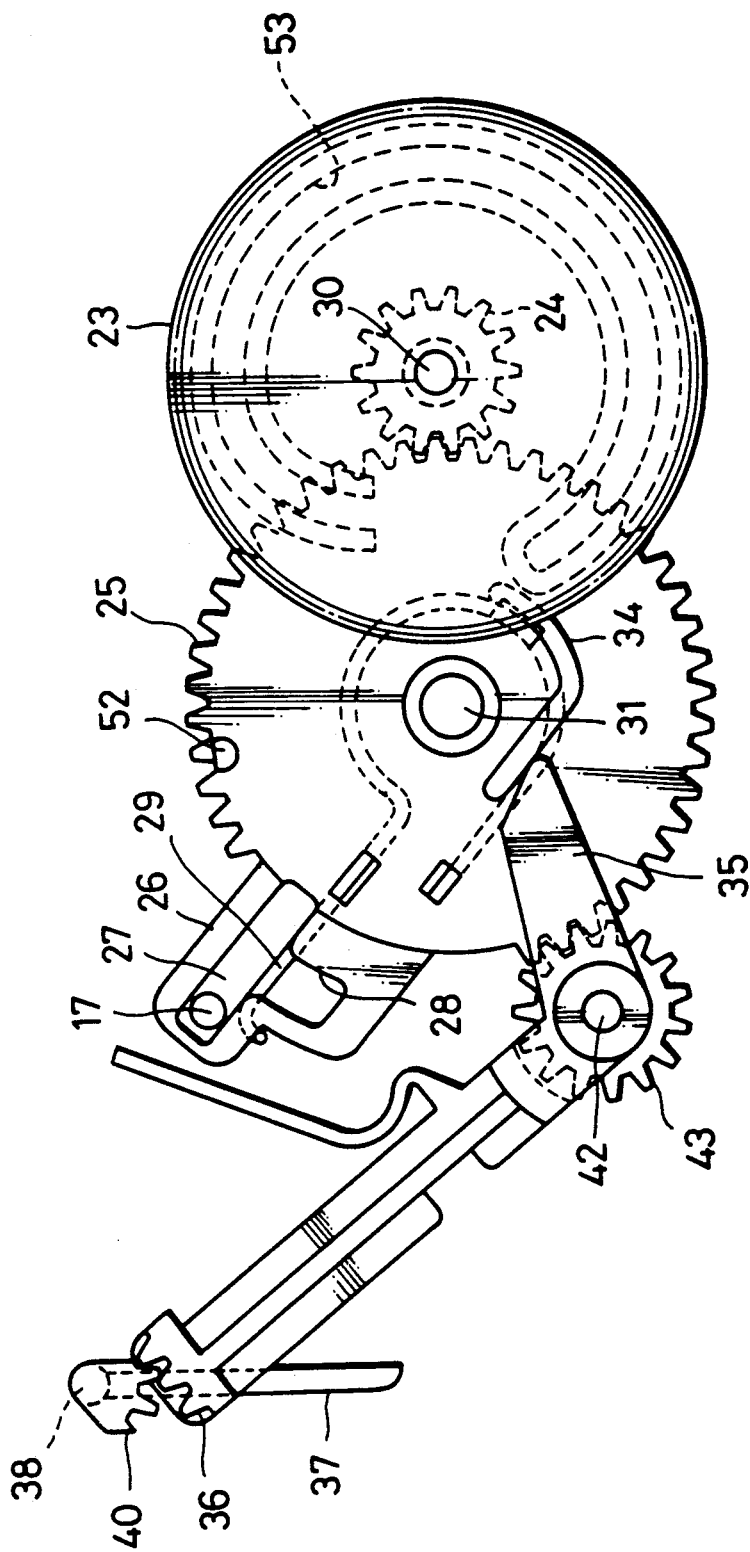
FIGS. 5 to 8 are elevational views of a main portion of the drive portion of the cassette loading apparatus according to an embodiment of the present invention showing sequential operational states thereof.
Figure 6:
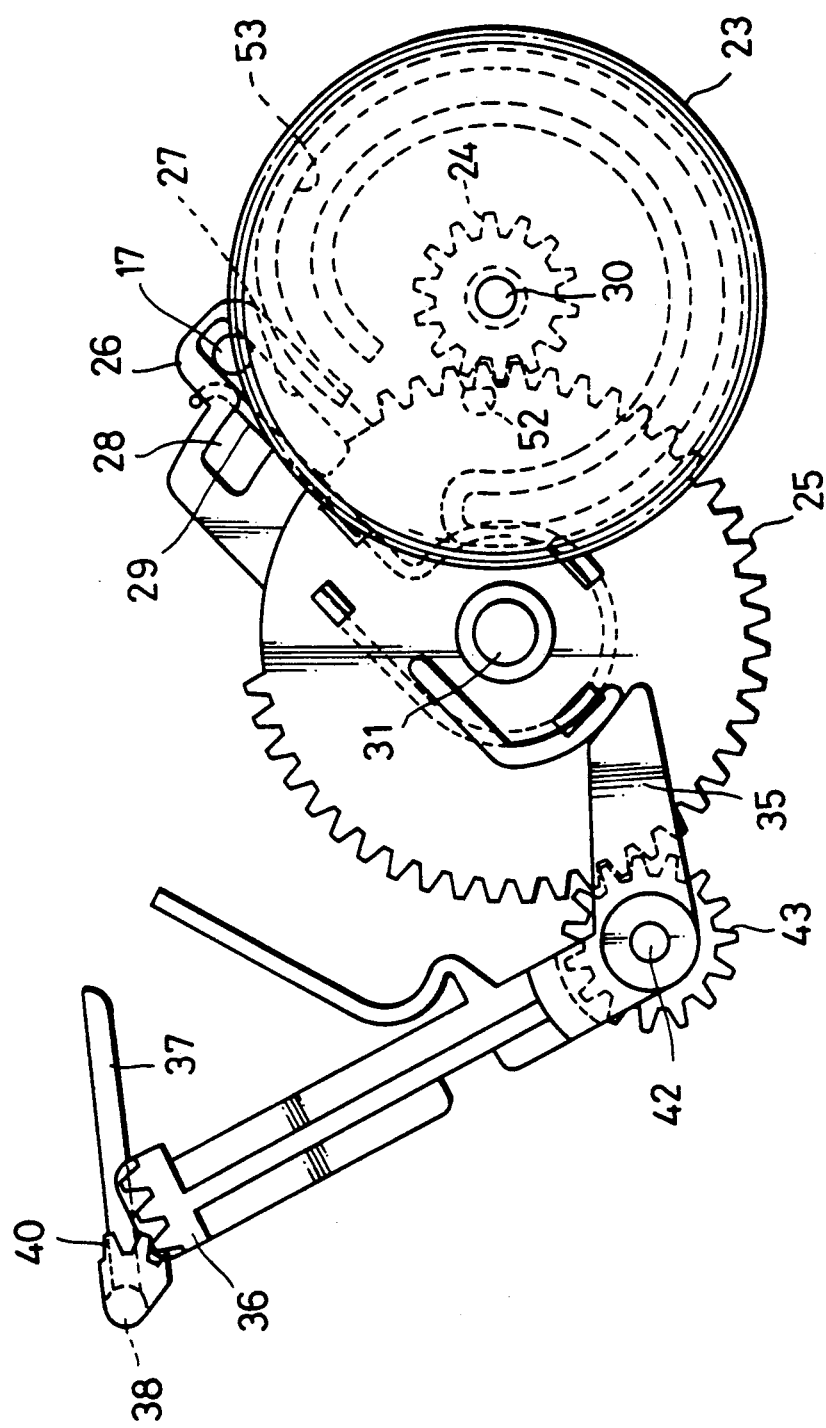
Figure 7:
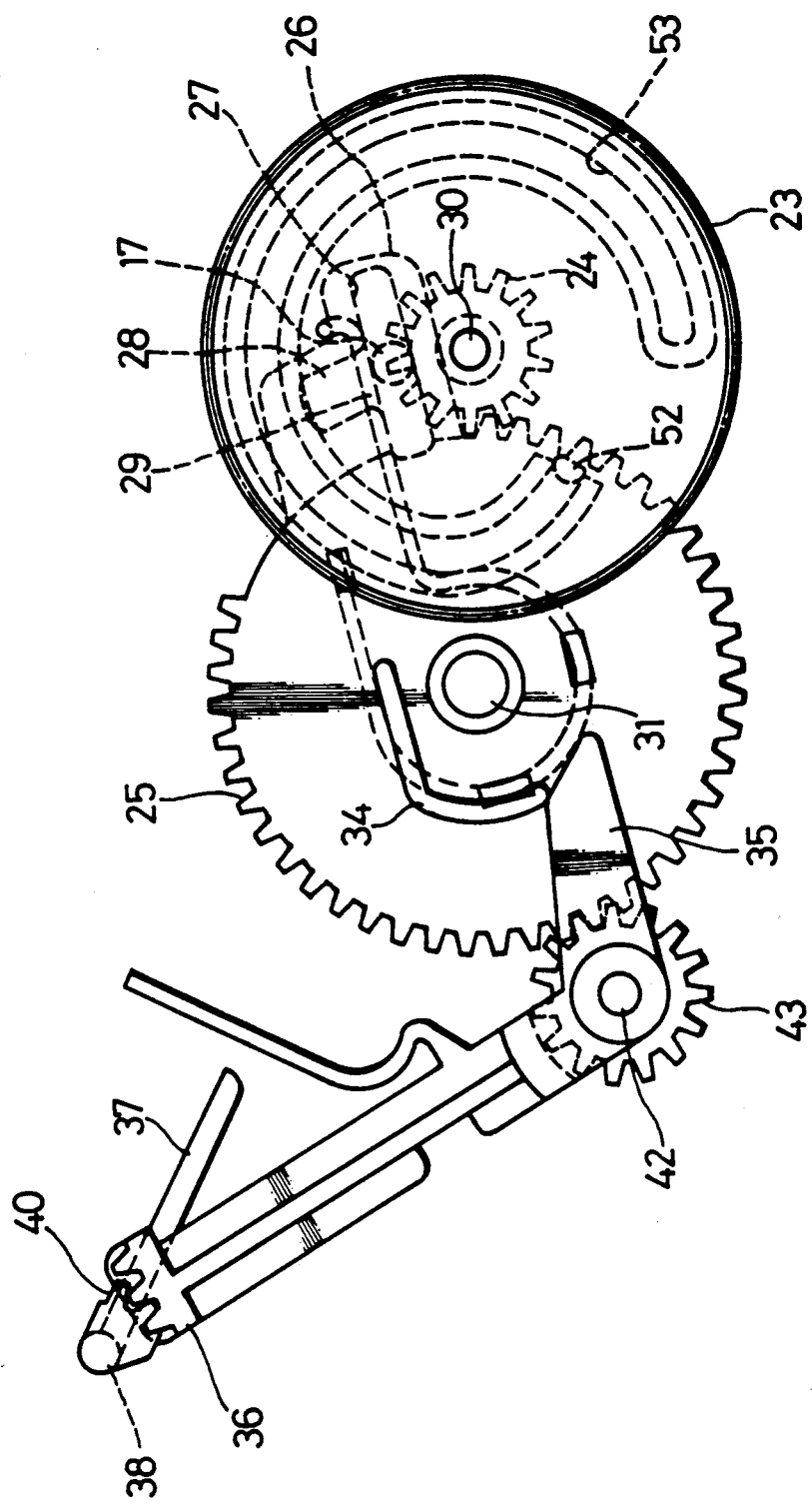

More specifically, in the sequential movement shown in FIGS. 5-8 when the movement of cassette holder 16 is started, as shown in FIG. 5, pin 52 and cam groove 53 are not yet in engagement with each other but when gear 25 is rotated in the clockwise direction by pinion 24, as shown in FIG. 6, pin 52 is received into the open end of cam groove 53, as shown in FIG. 7. When cassette holder 16 is completely moved to the loading position, pin 52 has moved near the end portion of cam groove 53, as shown in FIG. 8, so that pin 52 is pushed by, or jammed against, the side wall of cam groove 53, thereby preventing gear 25 from rotating in the counterclockwise direction.

More specifically, in the cassette loading apparatus according to this embodiment, cam groove 53 is provided with a so-called overlap portion such that gear 25 and pinion 24 are kept in a meshed condition until pin 52 is inserted into cam groove 53. Thus, a phase displacement, or independent rotation of the gears, can be avoided when the tape cassette moves downwardly, which is where a load tends to fluctuate. The overlap portion of cam groove 53 is formed in accordance with the shape of cam 53, so as not to change a rotational ratio determined by the gear ratio between gear 25 and pinion 24. Therefore, the overlap portion of the cam groove 53 is provided with both inside and outside walls relative to the pin 52.

In this embodiment, pinion 24 and gear 25 are meshed with each other and even when the engagement between gear 25 and pinion 24 is broken at a point past the interval where pin 52 is received by cam groove 53, that is, the overlap interval, cam groove 53 drives pin 52 to make the rotational ratio between pinion 24 and gear 25 equal to the gear ratio therebetween as determined by the respective gear teeth, thereby rotational fluctuations are removed. Alternatively, so long as the rotational speed does not fluctuate rapidly following the overlap interval, the rotational speed, which completely coincides with the gear ratio, need not be always provided in accordance with the shape of cam groove 53. Thus, it is possible to provide a substantially equal rotational speed for pinion 24 and gear 25 at the same radial distance from their respective centers.

Accordingly, in the overlap interval where pinion 24 and gear 25 are again meshed with each other from the locked condition, as shown from the operational positions regressing from FIG. 8 to FIG. 5, cam groove 53 and pin 52 operate as though pinion 24 and gear 25 are in engagement with each other. A repulsion occurring in the locking of cassette holder 16, as shown in FIG. 8, appears as a rotational moment of drive lever 26 and gear 25 in the counterclockwise direction. This rotational moment is received by the side wall of cam groove 53 of worm gear 23 via pin 52, so that when cassette holder 16 is in the locked state, a line connecting support shaft 31 of gear 25 and pin 52 and a line connecting support shaft 30 of gear 33 and pin 52 are perpendicular to each other.

According to the present invention, at least one of a pair of gears meshed with each other in a cassette loading gear train is formed as a geneva stop gear, and one of the pair of gears is provided with a locking member while the other gear is provided with a cam that is in engagement with the locking member. The length of this cam is increased, so that when the pair of gears are in engagement with each other, the locking member can be restricted by the cam. Further, even when the engagement between the pair of gears is broken by the geneva stop gear arrangement, the combination of the cam and the locking member applies a rotational ratio substantially equal to the gear ratio of the pair of gears. Thus, when the cassette holder is moved to the loading position, the locking member comes in contact with the cam, thereby locking the cassette holder against further movement. Therefore, the rotational force can be smoothly changed over from the gear to the cam without phase displacement, that is, independent rotation of the gears, unlike previously proposed cassette loading devices.

Further, even if the tape cassette is loaded by rotating the gear train from the follower side, such as may occur when the power supply is interrupted, the locking member is restricted by the cam when the tape cassette moves downwardly, so that it is possible to prevent tape slackening or the like due to vibrations, for example.

Furthermore, the shape of the cam is coaxially extended after the point where the cassette holder is locked, whereby the drive source can be stopped without requiring high accuracy. Therefore, system control, system design, and accuracy of assembly can be simplified.

Having described a preferred embodiment of the invention with reference to the accompanying drawings, it is to be understood that the invention is not limited to that precise embodiment of the invention and that various changes and modifications could be effected by one skilled in the art without departing from the spirit of scope of the novel concepts of the invention, as defined in the appended claims.

What is claimed is:

1. A cassette loading apparatus in which a tape cassette holder is moved by a drive source through a gear train to locate a tape cassette to a predetermined loading position, comprising:
    (a) a pair of gears arranged in mutual engagement and forming a part of the gear train, at least one gear of said pair of gears being formed as a geneva stop gear;
    (b) a locking member attached to one gear of said pair of gears; and
    (c) a cam formed on the other gear of said pair of gears, said cam being arranged for engagement with said locking member, said cam having a predetermined length on said other gear so that when said pair of gears are in engagement with each other said locking member is out of contact with said cam, and when said pair of gears are disengaged from each other by said geneva stop gear said locking member contacts said cam so that said pair of gears are rotated at a rotational ratio substantially equal to a rotational ratio caused by a gear ratio of said pair of gears by said cam contacting said locking member, wherein when said cassette holder is moved to a loading position said locking member binds against said cam so that relative rotation between said pair of gears is stopped, thereby locking the cassette holder.

2. A cassette loading apparatus according to claim 1, wherein the cassette holder is moved by said one gear of said pair of gears having said locking member.

3. A cassette loading apparatus according to claim 2, wherein the cassette holder is moved by said one gear of said pair of gears having said locking member formed thereon.

4. A cassette loading apparatus according to claim 1, wherein said gear having the cam is driven by the drive source through a worm.

5. A cassette loading apparatus according to claim 1, wherein said pair of gears and said locking member are arranged so that a straight line connecting a rotation center of said gear having the locking member and the locking member and a straight line connecting a position in which said locking member is held and a rotation center of said gear having the cam are substantially perpendicular to each other at the cassette holder loading position.

6. A cassette loading apparatus according to claim 1, wherein the drive source includes a worm and said gear having said cam formed therein is driven by said worm.

7. A cassette loading apparatus in which a tape cassette holder is driven by a drive source through a gear train so that a tape cassette in the tape cassette holder is moved to a loading position, comprising:
    a pair of gears arranged for engagement with each other so as to form a part of the gear train, at least one gear of said pair of gears being formed as a geneva stop gear;
    a locking member attached to a flat, side surface of one gear of said pair of gears; and
    a cam formed on a flat, side surface of the other gear of said pair of gears and being arranged for engagement with said locking member upon rotation of said pair of gears, said cam having a predetermined length so that when said pair of gears are in engagement with each other said locking members is out of contact said cam, and when said pair of gears are not in engagement with each other by operation said geneva stop gear said locking member contacts said cam so that said pair of gears are rotated at a rotational ratio substantially equal to a rotational ratio caused by a gear ratio of said pair of gears by interaction between said cam and said locking member, wherein when said cassette holder is moved to the loading position, said locking member binds against said cam so that relative rotation between said pair of gears is stopped, thereby locking the cassette holder.

* * * * *

UNITED STATES PATENT AND TRADEMARK OFFICE
CERTIFICATE OF CORRECTION

PATENT NO. : 5,050,022
DATED : September 17, 1991
INVENTOR(S) : Hidekuni Aizawa It is certified that error appears in the above-identified patent and that said Letters Patent is hereby corrected as shown below:

```
Col. 6, line 39  change "therein" to --thereon--
        line 57  after "operation" insert --of--
```

Signed and Sealed this

Thirtieth Day of March, 1993

*Attest:*

STEPHEN G. KUNIN

*Attesting Officer*     *Acting Commissioner of Patents and Trademarks*